United States Patent [19]

Bowen

[11] Patent Number: 4,511,520

[45] Date of Patent: Apr. 16, 1985

[54] METHOD OF MAKING PERFORATED FILMS

[75] Inventor: William E. Bowen, Neenah, Wis.

[73] Assignee: American Can Company, Greenwich, Conn.

[21] Appl. No.: 402,759

[22] Filed: Jul. 28, 1982

[51] Int. Cl.$^3$ .............................................. B29C 17/08
[52] U.S. Cl. .................................. 264/22; 156/244.19;
  156/253; 156/277; 264/25; 264/132; 264/154;
  264/171
[58] Field of Search .................... 264/22, 25, 154, 156,
  264/DIG. 46, DIG. 62, 132, 171;
  156/244.16–244.19, 253, 277; 425/174.4, DIG.
  37, 290, 80

[56] References Cited

U.S. PATENT DOCUMENTS

| | | | |
|---|---|---|---|
| 2,699,113 | 1/1955 | Hoover | 264/25 |
| 2,715,363 | 8/1955 | Hoover | 264/25 |
| 2,763,759 | 9/1956 | Mito et al. | 264/25 |
| 3,587,459 | 6/1971 | Spencer et al. | 264/156 |
| 3,999,918 | 12/1976 | Landsman | 425/174.4 |
| 4,117,181 | 9/1978 | Minami et al. | 156/277 |

FOREIGN PATENT DOCUMENTS

| | | | |
|---|---|---|---|
| 2115548 | 10/1972 | Fed. Rep. of Germany | 264/25 |
| 2427862 | 1/1975 | Fed. Rep. of Germany | 264/154 |
| 2406955 | 9/1975 | Fed. Rep. of Germany | 425/174.4 |
| 50-53450 | 5/1975 | Japan | 264/22 |
| 53-8679 | 1/1978 | Japan | 264/25 |
| 7001320 | 8/1971 | Netherlands | 425/174.4 |

Primary Examiner—Jeffery Thurlow
Attorney, Agent, or Firm—Stuart S. Bowie; Douglas W. Wyatt; James W. Badie

[57] ABSTRACT

A perforated plastic film is produced by forming a pattern of light absorbing material (e.g., in dot and/or circular forms) on the film and subjecting the printed film to radiant energy from a light source in order to melt the film areas covered with the light absorbing material, thus producing a corresponding plurality of perforations in the plastic film.

17 Claims, 4 Drawing Figures

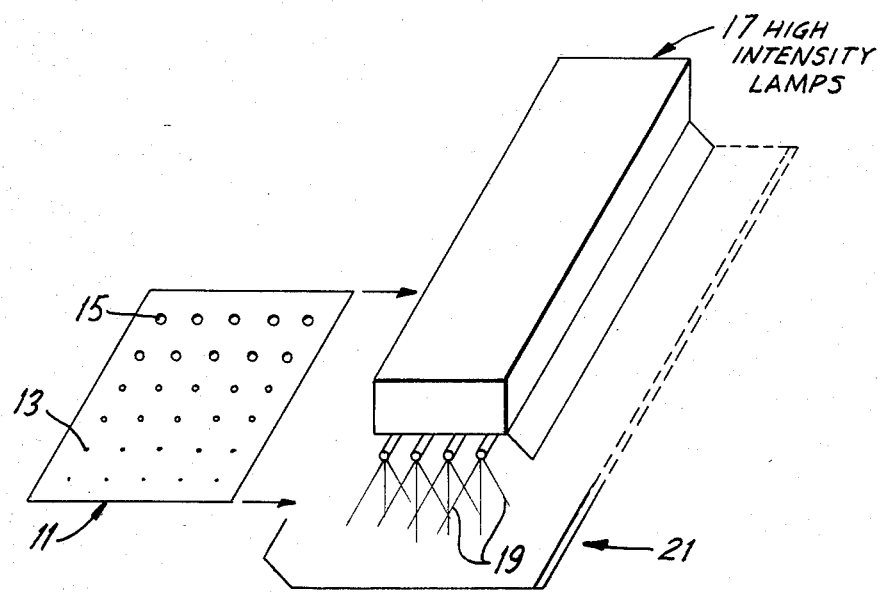
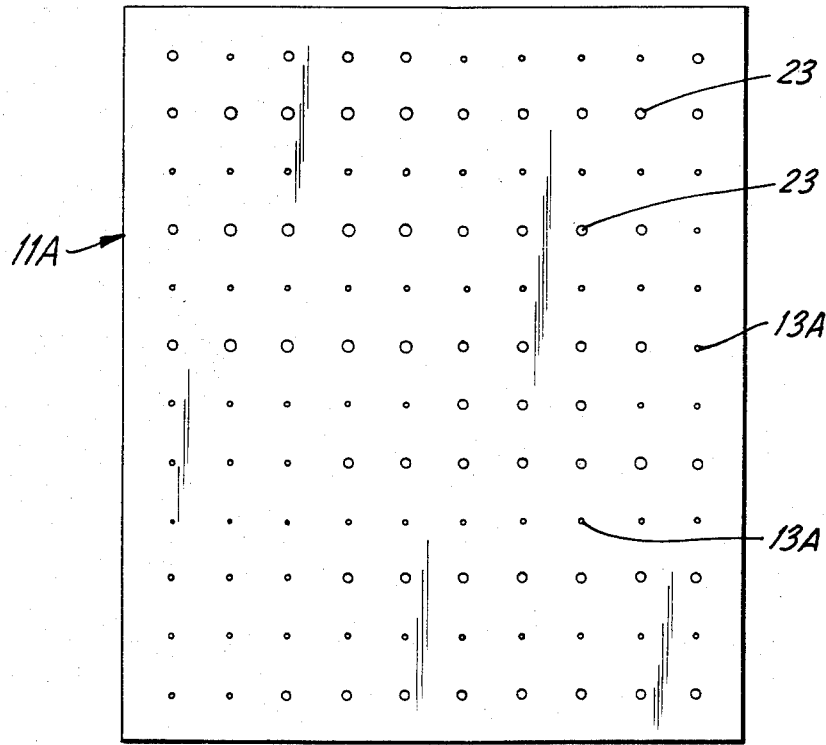
FIG.1
FIG.2

METHOD OF MAKING PERFORATED FILMS

FIELD OF INVENTION

This invention generally relates to perforated films and is particularly related to a method of producing a preselected matrix of perforations in plastic films.

BACKGROUND OF INVENTION

Perforated plastic films are sometimes used in structures wherein it is necessary to control the passage of fluids (liquids or gases) and solid particulate matters. Such structures include geotextile fabrics, chemical release packages and packages designed to control the moisture content or permit the passage of oxygen or other gases, etc. Heretofore, perforated plastic films have been produced by mechanical means, such as by mechanical punches or hot needles, or by the application of laser beams. Needless to say that the application of laser beams is a rather cumbersom technique, expensive and requires great precision. Mechanical punching, on the other hand, is not entirely satisfactory and requires complicated assembly and tooling, particularly when it is desired to produce a matrix of perforations of various patterns and/or sizes.

Accordingly, it is an object of the present invention to provide a more reliable and more economical an effective method of producing perforated plastic films.

It is also an object of this invention to produce a perforated plastic film wherein the sizes and numbers of perforations are precisely controlled in accordance with a predetermined matrix.

The foregoing and other objects and features of this invention will become more evident from the ensuring detailed description and the accompanying drawings.

SUMMARY OF THE INVENTION

In accordance with this invention, a light absorbing material is deposited or printed as a plurality of dots, circles or other configurations on a plastic film, which is preferably oriented. The plastic film is then subjected to heat by passing it under a high intensity light source whereby the light source heats the printed areas causing localized melting, thus producing a corresponding plurality of perforations in the film.

BRIEF DESCRIPTION OF THE DRAWING

FIG. 1 is a simplified schematic representation illustrating the method of this invention;

FIG. 2 illustrates a perforated plastic film produced by the method of this invention wherein a matrix of light-absorbing dots were deposited on the film prior to heat treatment;

DETAILED DESCRIPTION OF THE INVENTION

Figure 3:
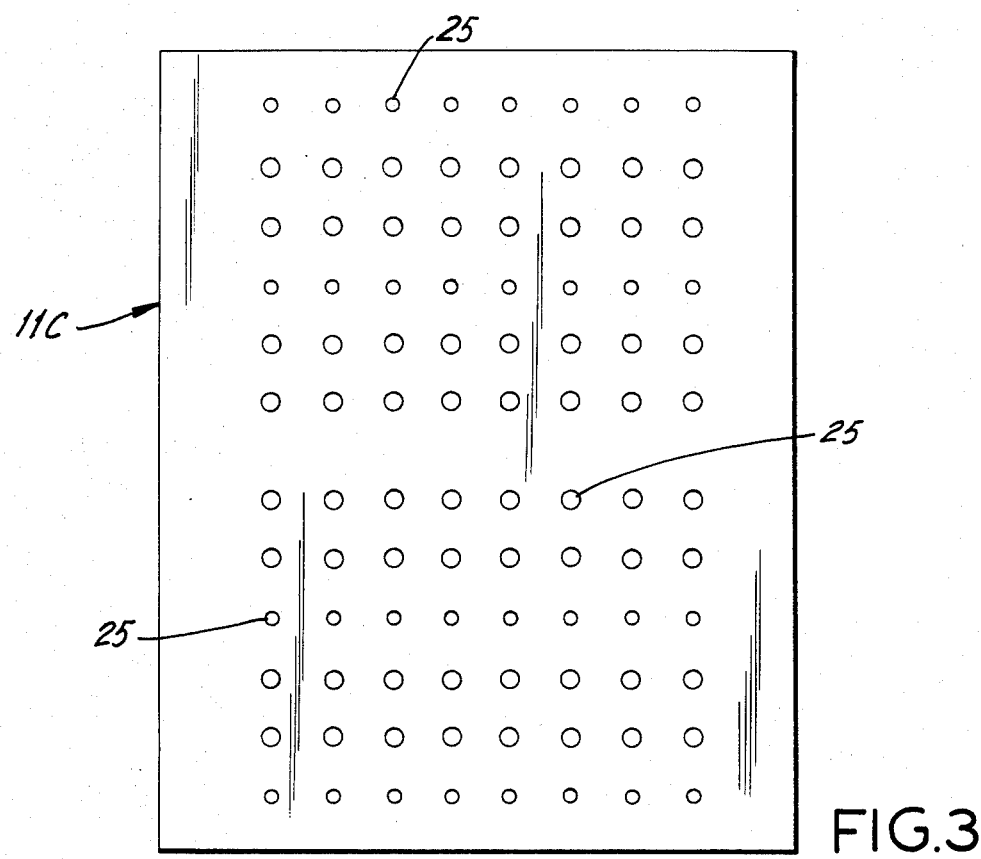
FIG. 3 is similar to FIG. 2 except that a matrix of light-absorbing circles were deposited on the film prior to heat treatment.
Figure 4:
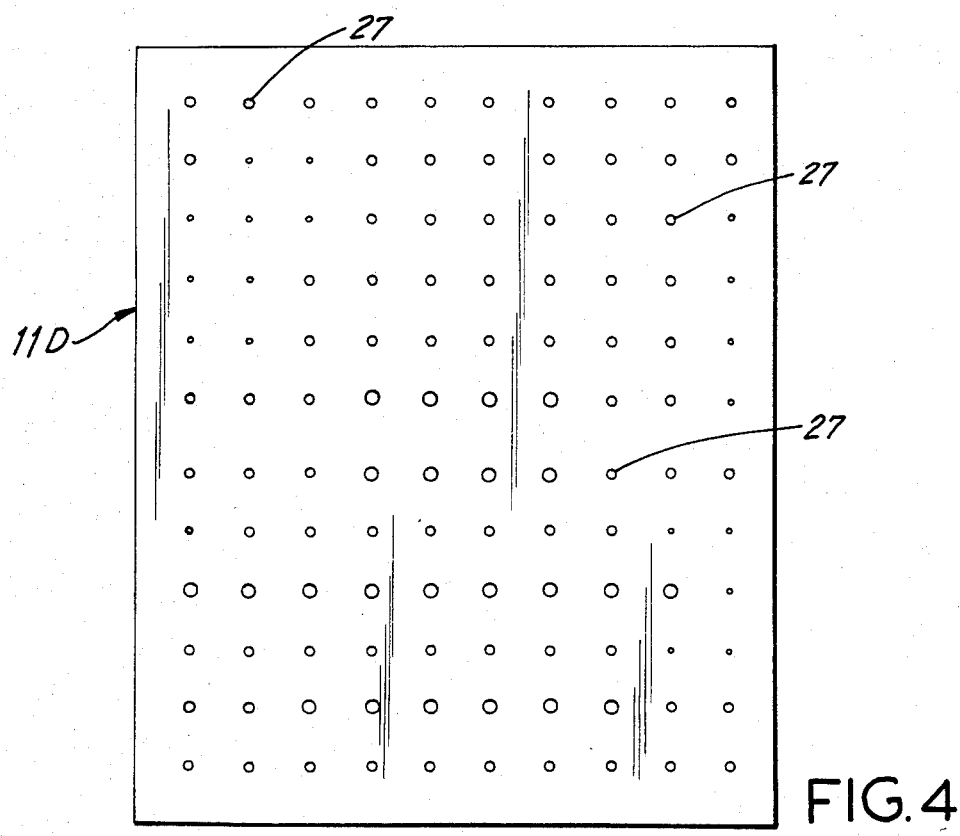
FIG. 4 illustrates another perforated film of a plastic material produced by the method of this invention.

The method of this invention broadly comprises depositing a predetermined matrix or pattern of light absorbing material on a plastic film and subjecting the resulting plastic film to heat, such as the heat generated by an infra-red source, under controlled time and temperature conditions such that perforations are produced corresponding to the matrix of the deposits on the film without, however, melting or otherwise impairing the structural integrity of the remaining film portion.

Thus, and describing the invention with a greater degree of specificity, the method of this invention involves the following steps:

(a) deposit energy or light absorbing material as a predetermined matrix of dots and/or circles on a web of a plastic film;

(b) subject the plastic film web to the action of heat by passing the web continuously past an infra-red light source; and (c) control the web speed so that the heat produced from the infra-red source melts the matrix of the deposited light absorbing material without melting the remaining portion of the film.

Referring to the drawings, there is shown, in FIG. 1, a web of plastic film 11, on which is deposited a matrix of light absorbing material (e.g., ink) in the form of dots 13 and circles 15, is conveyed (conveyor not shown) past a high intensity infra-red lamp 17 which emits rays 19 of specified wavelengths depending on the nature of the plastic film and/or the light absorbing material. The speed of the plastic web 11 and the heat intensity from the infra-red are so selected that the light (or heat) absorbed by the plastic film is such as to substantially heat and melt the light absorbing material and the adjacent film area without melting the remaining plastic and without degrading the instructural integrity of the plastic film.

In order to improve the speed of operation, i.e., the formation of perforations corresponding to the deposits of the light absorbing material, a reflective surface such as, for example, polished aluminum is placed under the web of the plastic material. The provision of a reflective surface increases the efficiency of light utilization, and therefore, the heat which is absorbed by the matrix as the plastic web 11 passes under the infra-red lamp source thus accelerating the melting rate of the plastic.

The light absorbing material which is deposited on the plastic film in accordance with this invention must be heat conductive and capable of absorbing light at a greater rate than the plastic film itself so as to cause heat concentration, and hence faster melting, in the deposited areas to open up the desired holes or perforations in those areas. It can be appreciated that various types of light absorbing materials may be employed to achieve the objectives of the invention. For example, various types of inks may be satisfactorily employed for this purpose and, accordingly, they constitute the light absorbants of choice. When using ink, the color, type and amount of pigment, the printing density amount of ink applied to each area and the resin binder are significant considerations since they affect the light abosrbing property and thermal conductivity of the ink. Black ink such as the ink manufactured by Converter Ink Company, Linden, N.J., and designated by number P76584, has been found to be very satisfactory and hence used as the light absorbing material to illustrate the present invention. Other suitable inks or other light absorbing materials may also be used and the invention is not limited to the particular ink which is used herein for illustrative purposes. Similarly, solid light absorbing materials may be employed.

The printed pattern or matrix of deposits or prints of the light absorbing material on the plastic film may consist of a plurality of dots (solid areas) or they may be circular in form or some other desired configuration.

The deposits are formed as a preselected geometrical configuration and may be dispensed from a variety of suitable devices such as, e.g., flexographic or rotogravure printing system. The dots or the circular deposits may be of various sizes and configurations but, in general, they must be sufficiently large so that enough heat is absorbed by the light absorbing material in relatively short time to melt the plastic film covered by the deposited areas and open up holes or perforations at those areas. Smaller deposits of the light absorbing material require longer exposure to light in order to open up the holes since light is absorbed through a smaller surface area, whereas for larger deposits, increased surface area affords greater degree of light absorbance and, therefore, larger heat concentration, thus accelerating the formation of the perforations in the plastic film.

Although various types of plastic materials are suitable for making a perforated film, it is generally preferred to use a plastic film that is "oriented". When an oriented plastic film is heated (e.g., by subjecting it to the action of light), the stress from the orientation of the plastic will cause the molten materials in the printed areas to draw back toward the cooler surrounding and hence aid in the formation of the perforations. Other factors which must be considered in the selection of the plastic film include melting (or softening) point and film thickness. These factors are not, per se, critical in this invention but do affect the web speed and the radiant energy requirements. In all cases, however, the plastic material must be such that there is greater light absorption, and thus greater heat concentration, at the printed areas than at the non-printed areas of the plastic film.

The plastic materials which are suitable in the practice of this invention include polyester, polyamides, polyolefins and polycarbonate, etc., which are preferably oriented.

An infra-red light source may be conveniently used to provide the radiant energy required to open up the printed areas into a matrix of perforations. A series of light sources may be used and the plastic web 11 may thus be conveyed past one or more light sources. The web speed and the distance between the plastic web 11 and the light source 17 may be adjusted, as desired, depending upon the intensity of the radiant energy and the time required to produce the perforations in the plastic web. A reflective surface 21 (FIG. 1) such as polished aluminum may be used under the plastic web opposite the light source in order to accelerate the formation of the perforations.

Referring now to FIG. 2, there is shown a plastic web 11A having a matrix of dots 13A and perforations 23 formed after passing the plastic web under a linear quartz lamp of ⅜ inch diameter, operating at 100 watts per inch. Initially, the plastic web, which is an oriented plastic film, Valeron, trademark of Van Leer Plastics, Houston, Tex., for cross-laminated, oriented polyethylene, was printed with a matrix of relatively small dots of black ink (Number P76584, available from the Converter Ink Company) to which was added 10 percent carbon black to enhance its light absorption and heat conductivity. The dots were 0.9 to 1.8 mm in diameter and the circles were 20 to 30 mm in diameter. After passing the plastic web under the light source as illustrated in FIG. 1, some of the dots were opened up into perforations 23 as a result of the heat produced from the light source, whereas others did not. This indicates that insufficient radiant energy was absorbed by some of the printed dots and hence the plastic did not melt sufficiently at those areas to produce the desired perforations.

FIG. 3 is similar to FIG. 2 except for using a pattern of printed circles of larger diameters than the printed dots in FIG. 2. When the web of the Valeron plastic was passed under the light source under conditions similar to FIG. 2, the resulting plastic web 11C was formed with perforations 25 corresponding to the printed circular ink.

The perforated structure shown in FIG. 3 was produced by subjecting a web of an oriented polypropylene B500, available from Hercules, Inc. to the action of light as described in connection with FIGS. 2 and 3. The polypropylene web 11D was printed with dots of larger diameter than the printed dots in FIG. 2 and hence were capable of absorbing the radiant energy at a faster rate to produce the corresponding perforations 27.

In forming a pattern of circular areas of the light absorbing material, the material is printed or deposited around the circumference of finite circles in the matrix. Thus, the area defined within each circle is not covered or printed with the light absorbing material. However, when a pattern of solid dots is formed on the plastic film, the light absorbing material forms a continuous cover or coating on the dotted areas.

In a different embodiment of this invention, the pattern may be printed, in register, on opposing surfaces of this film in order to increase the amount of the energy absorbing material.

In still another embodiment, the pattern may be printed on one surface of the film and the film is then laminated (by heat or suitable adhesive) to another film so that the light absorbing material is buried between the two films. This arrangement will increase contact between the light absorbing material and the film and will concentrate the heat within the area where the perforations are to be formed, thus improving the heating efficiency.

Thus, as it is evident from the foregoing description, a perforated plastic film may be produced by the method of this invention wherein the plastic film has a predetermined perforated pattern with uniform or varying sizes of perforations. It is further evident that several changes and modifications may be made in the method of this invention which are suggested by, and obvious from, the present disclosure.

What is claimed is:

1. A method of producing a perforated plastic film for passage of fluid therethrough which comprising forming a pattern of light-absorbing material on spaced finite areas on one surface of said plastic film, subjecting said plastic film to a light source and causing light generated from said light source to be absorbed by said light-absorbing material thereby melting the plastic film at the areas covered by said light-absorbing material without melting the remaining areas in said plastic film and producing perforations through said film at said areas.

2. A method as in claim 1 wherein said plastic film is an oriented film.

3. A method as in claim 1 wherein said light absorbing material is a thermally conductive ink.

4. A method as in claim 2 wherein said light absorbing material is a thermally conductive ink.

5. A method as in claim 1 wherein the configuration of said areas of light absorbing material is in a generally circular form or in solid dot form.

6. A method as in claim 2 wherein the configuration of said areas of light absorbing material is in a generally circular form or in solid dot form.

7. A method as in claim 3 wherein the configuration of said areas of light absorbing material is in a generally circular form or in solid dot form.

8. A method as in claim 4 wherein the configuration of said areas of light absorbing material is in a generally circular form or in solid dot form 9. A method as in claim 1 wherein the pattern of light absorbing material is formed on spaced finite areas on opposing surfaces of said film such that the pattern of light absorbing material on one surface of said film is in register with the pattern of light absorbing material on the opposing surface of said film.

10. A method as in claim 9 wherein said plastic film is an oriented film.

11. A method as in claim 9 wherein said light absorbing material is a thermally conductive ink.

12. A method as in claim 10 wherein said light absorbing material is a thermally conductive ink.

13. A method as in claim 1 including the additional step of laminating said perforated plastic film to a second plastic film.

14. A method as in claim 13 wherein said perforated plastic film is an oriented film.

15. A method as in claim 13 wherein said light absorbing material is a thermally conductive ink.

16. A method as in claim 14 wherein said light absorbing material is a thermally conductive ink.

17. A method of producing a perforated plastic film for passage of fluid therethrough which comprises forming a pattern of light-absorbing material on spaced finite areas on a surface of a first plastic film, laminating a second plastic film onto said surface and subjecting the resulting laminate to a light source to be absorbed by said light-absorbing material thereby melting the plastic film covered by said light-absorbing material without melting the remaining areas in the plastic film to produce perforations through said laminate at said areas.

* * * * *